(68.)

2 Sheets—Sheet 1.

R. HEMINGRAY.
Moulding Glass Telegraph Insulators.

No. 122,015.  Patented Dec. 19, 1871.

R. Hemingray
INVENTOR.
By Knight Bros
Attys.

Attest.
Jas. H. Layman
Jno. Kitch

R. HEMINGRAY.

Moulding Glass Telegraph Insulators.

No. 122,015. Patented Dec. 19, 1871.

R. Hemingray
INVENTOR.
By Hughs Bros
Attys

Attest.
Jas. H. Layman
John Kilb

122,015

UNITED STATES PATENT OFFICE.

ROBERT HEMINGRAY, OF COVINGTON, KENTUCKY.

IMPROVEMENT IN MOLDING TELEGRAPH-INSULATORS.

Specification forming part of Letters Patent No. 122,015, dated December 19, 1871.

*To all whom it may concern:*

Be it known that I, ROBERT HEMINGRAY, of Covington, Kenton county, Kentucky, have invented a new and useful Process in Molding Telegraph-Insulators, of which the following is a specification:

The customary glass insulator for telegraphic purposes consists of an inverted cup of cylindrical or conoidal form grooved exteriorly for the telegraph-wire, and having an interior cavity of two unequal diameters, the deeper and narrower portion being screw-threaded, as shown in the accompanying drawing. This partially screw-threaded cavity was formerly made at one operation by sinking into the lump of molten glass within the mold a former or mandrel of corresponding form, which was afterward screwed out from the mold; but this mode was subject to serious difficulties, owing to the liability of the mandrel to become heated and stick to the intensely-heated lump of glass.

To obviate this difficulty, I devised and made application for a patent for a plan whereby the entire cavity was created by a simple cylindrical plunger, and the thread subsequently formed on the narrower portion by a screw-threaded mandrel, which, having accomplished its purpose, was unscrewed from the glass; but this plan, although better than the first named, was found in practice to be subject to the opposite defect, the glass becoming too much chilled before the second mandrel could be inserted to produce a deep smooth and otherwise perfect thread. I now accomplish the purpose with complete success by a mode of operation intermediate in character and result, yet distinctly different in means from the above. The said mode of operation consists in, first, by means of suitable mold and plunger, forming a blank with external groove and the larger unthreaded portion of the cavity, and while the body of glass at bottom of the said partial cavity is yet hot sinking into it a properly screw-threaded mandrel having a collar to preserve the proper form of the non-threaded and wider portion of the cavity, which collar is, preferably, in the form of a cylindrical sleeve, that, resting by its weight upon the portion of glass which surrounds the mandrel proper, yields to the ascent of said glass as it is displaced by the mandrel and imparts the proper finish.

Figure 1:
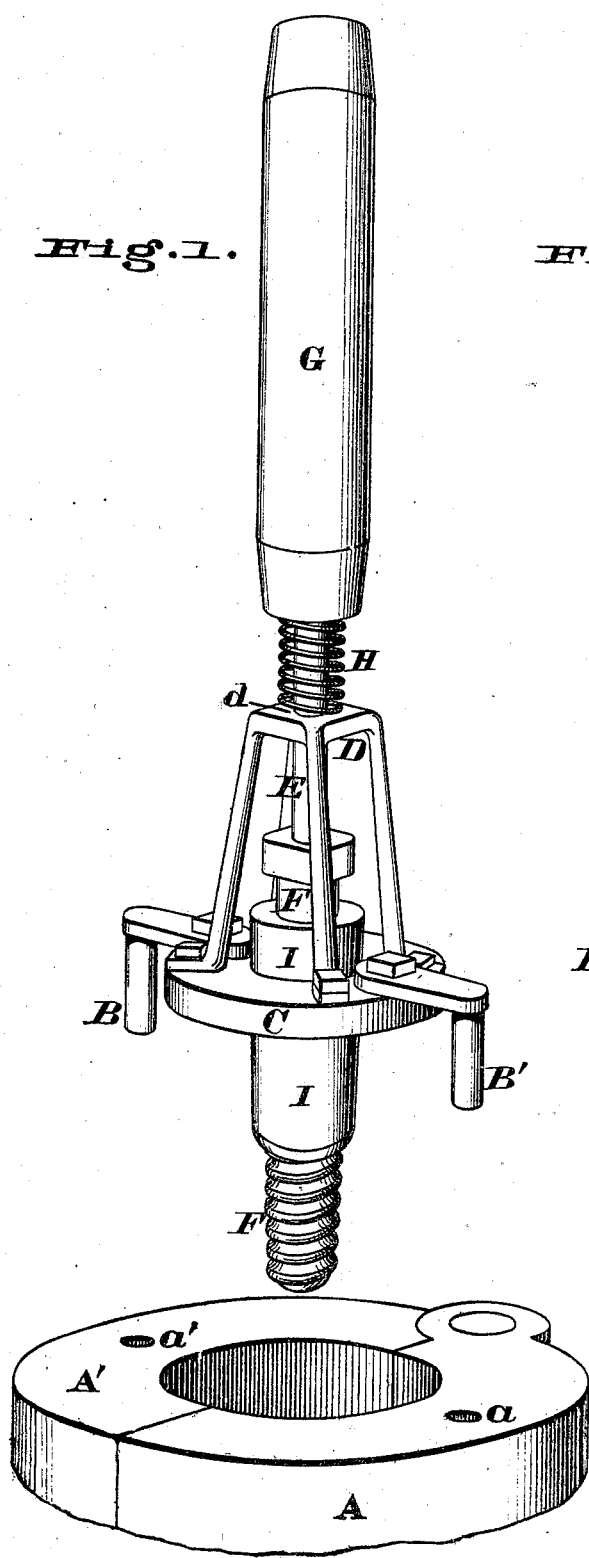
Figure 2:
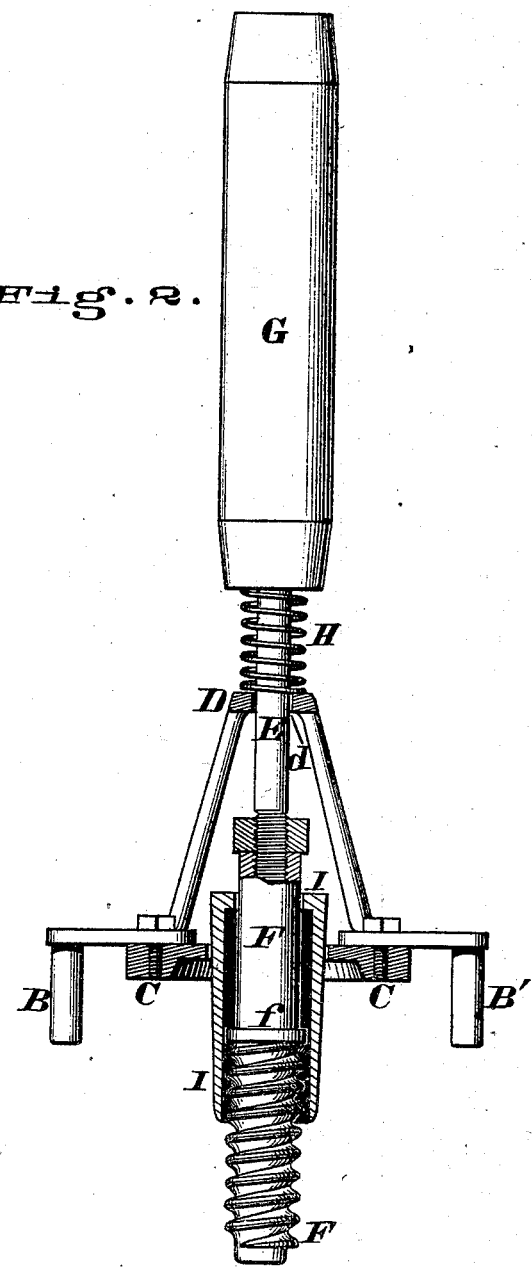
Figure 3:
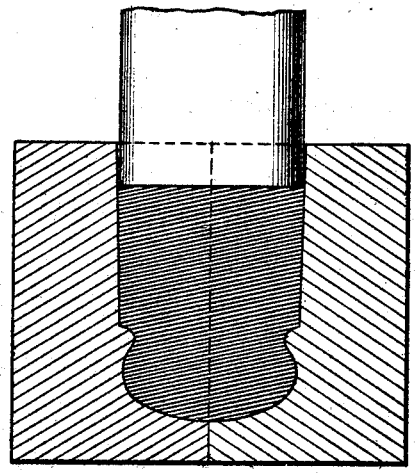
Figure 4:
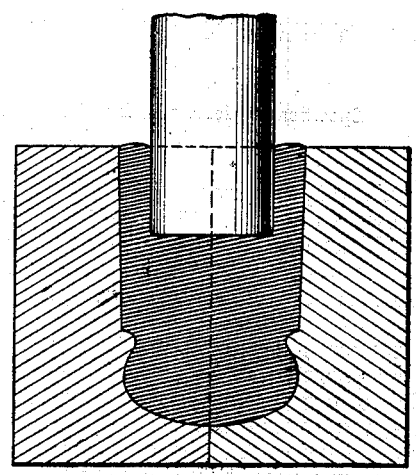
Figure 5:
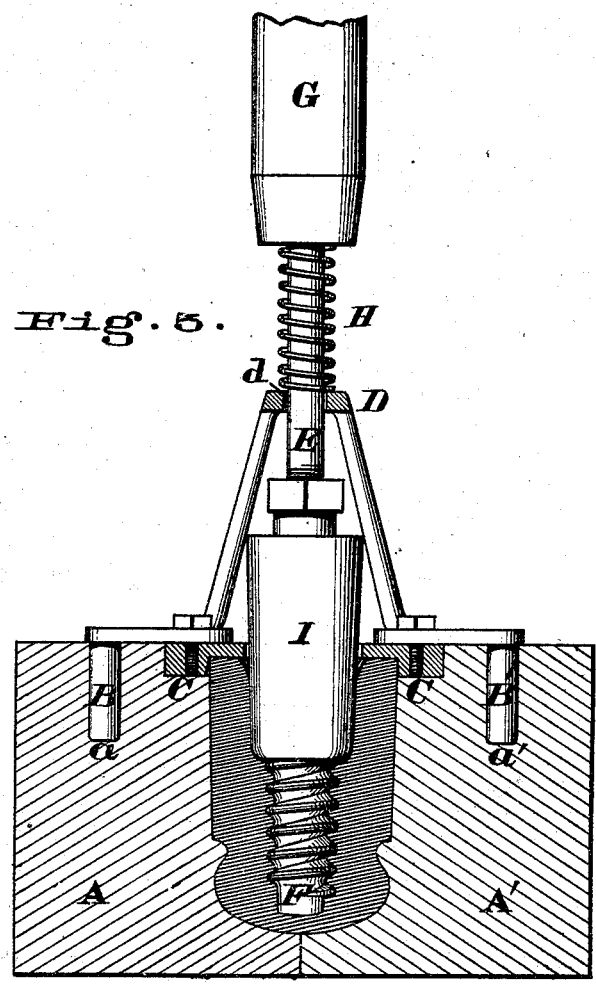
Figure 6:
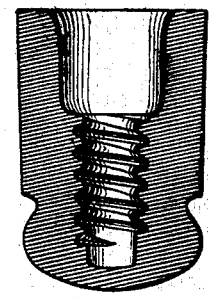

In the accompanying drawing, Figure 1 is a perspective view of the preferred form of my improved plunger or mandrel and its appurtenances. Fig. 2 is an axial section of the same. Figs. 3 and 4 represent, by axial sections, the successive stages in the manufacture of the instrument on my plan. Fig. 5 is an axial section, showing my plunger in position within the mold. Fig. 6 is a longitudinal section of the finished insulator.

A A' may represent the two parts of a suitable mold for forming the exterior of the insulator. $a\ a'$ are orifices in the top of the mold to hold the pins B B' of annular guide-head or plate C, which rests upon the top of the mold. Rising from the plate C is a spider, D, whose orifice $d$ receives and guides the stem E of my screw-threaded mandrel or plunger F. This stem has a shoulder, $f$, and a handle, G, which co-operate with a spiral spring, H, to hold the mandrel to its proper normal position when not in use. I is a sliding collar or sleeve, whose upper central orifice engages around the mandrel-stem, and whose lower portion surrounds the threaded portion of the mandrel. This sleeve, as the molten glass rises in the mold by the displacement of the descending plunger, by preventing the irregular ascent of the said glass imparts the proper form to the shoulder which marks the boundary between the threaded and unthreaded portions of the cavity. In addition to the use mentioned above, the spiral spring H, by counteracting the weight of the mandrel, facilitates its extraction from the completed insulator, which act is effected by simply uncrewing the mandrel therefrom. The spiral spring also operates to keep the plate C in position on the top of the mold when in rest.

The expression "cylindrical" will be understood by practical men to admit such slight draft or taper as will permit ready extraction from the mold of the parts thus designated.

While describing the preferred form of my invention, I reserve the right to vary the same—for example, an inferior modification of my invention might have the collar fixed permanently at the proper height upon the mandrel, but such unyielding collar would be objectionable because, if too much glass were taken into the mold it would be impossible to insert the plunger to its proper depth, and if too little glass were introduced the proper finish to the shoulder would not be given.

I claim herein as new and of my invention—

1. The mode or process of forming the cavity in telegraphic insulators by first forming the unthreaded wider portion of the cavity by a threadless plunger, and, while the glass is yet hot, forming the threaded deeper portion by means of a screw-threaded plunger or mandrel, substantially as set forth.

2. The described combination, with the mandrel F, of the collar or sleeve I, whether yielding or otherwise.

3. In the described combination with the mandrel F, the spring H, for the purpose designated.

In testimony of which invention I hereunto set my hand.

R. HEMINGRAY.

Witnesses:
  GEO. H. KNIGHT,
  JAMES H. LAYMAN.

(68)